(12) United States Patent
Roberts et al.

(10) Patent No.: US 10,208,885 B2
(45) Date of Patent: Feb. 19, 2019

(54) CORROSION RESISTANT SHEET METAL JACKETING

(75) Inventors: James M. Roberts, Houston, TX (US); Michael Starozhitsky, Long Grove, IL (US); Andrea C. McMartin, Evanston, IL (US); Michael B. Scoby, Shaker Heights, OH (US); Algis P. Suopys, Lindenhurst, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1093 days.

(21) Appl. No.: 12/405,708

(22) Filed: Mar. 17, 2009

(65) Prior Publication Data

US 2009/0250136 A1    Oct. 8, 2009

Related U.S. Application Data

(60) Provisional application No. 61/042,985, filed on Apr. 7, 2008.

(51) Int. Cl.
| | |
|---|---|
| *F16L 9/14* | (2006.01) |
| *F16L 58/00* | (2006.01) |
| *F16L 58/10* | (2006.01) |
| *B32B 1/08* | (2006.01) |
| *B32B 15/08* | (2006.01) |

(Continued)

(52) U.S. Cl.
CPC ............ *F16L 58/1054* (2013.01); *B32B 1/08* (2013.01); *B32B 7/12* (2013.01); *B32B 15/08* (2013.01); *B32B 15/18* (2013.01); *B32B 15/20* (2013.01); *B32B 27/16* (2013.01); *B32B 27/304* (2013.01); *B32B 27/308* (2013.01); *B32B 27/32* (2013.01); *B32B 27/322* (2013.01); *B32B 27/36* (2013.01); *F16L 59/10* (2013.01); *B32B 2255/06* (2013.01); *B32B 2255/26* (2013.01); *B32B 2307/304* (2013.01); *B32B 2307/308* (2013.01); *B32B 2307/554* (2013.01); *B32B 2307/712* (2013.01); *B32B 2307/714* (2013.01);

(Continued)

(58) Field of Classification Search
USPC ....................................................... 428/421
See application file for complete search history.

(56) References Cited

U.S. PATENT DOCUMENTS

| | | | | |
|---|---|---|---|---|
| 3,489,642 | A | * | 1/1970 | Heuse ............................. 428/443 |
| 3,616,299 | A | * | 10/1971 | Hata et al. ..................... 205/142 |

(Continued)

FOREIGN PATENT DOCUMENTS

| | | |
|---|---|---|
| DE | 2744874 | 4/1979 |
| DE | 20018188 | 1/2001 |

(Continued)

OTHER PUBLICATIONS

ASSDA, ASSDA Technical Bulletin 200 Series Stainless Steels CRMN Grades, Oct. 2006, Edition 1, pp. 1-3.*

(Continued)

*Primary Examiner* — Callie E Shosho
*Assistant Examiner* — Patrick N English
(74) *Attorney, Agent, or Firm* — Levenfeld Pearlstein, LLC

(57) ABSTRACT

A corrosion resistant jacket for insulated pipes and components includes an outer polymeric layer film, an inner polymeric layer and a core layer of a lesser stainless steel material disposed between the outer polymeric layer film and the inner polymeric layer.

16 Claims, 2 Drawing Sheets

(51) Int. Cl.
*B32B 15/18* (2006.01)
*B32B 27/32* (2006.01)
*F16L 59/10* (2006.01)
*B32B 7/12* (2006.01)
*B32B 15/20* (2006.01)
*B32B 27/16* (2006.01)
*B32B 27/30* (2006.01)
*B32B 27/36* (2006.01)

(52) U.S. Cl.
CPC ............... *B32B 2307/7242* (2013.01); *B32B 2307/7265* (2013.01); *B32B 2597/00* (2013.01)

(56) References Cited

U.S. PATENT DOCUMENTS

| | | | |
|---|---|---|---|
| 3,755,029 A * | 8/1973 | Ellis | F16L 59/02 156/71 |
| 4,213,487 A * | 7/1980 | Funk et al. | 138/149 |
| 4,403,004 A * | 9/1983 | Parker et al. | 428/31 |
| 4,804,158 A | 2/1989 | Collins et al. | |
| 4,856,494 A | 8/1989 | Schussler | |
| 5,014,866 A | 5/1991 | Moore | |
| 5,030,504 A | 7/1991 | Botsolas | |
| 5,035,941 A * | 7/1991 | Blackburn | 442/398 |
| 5,193,644 A | 3/1993 | Hart et al. | |
| 5,318,076 A | 6/1994 | Klein | |
| 5,408,832 A | 4/1995 | Boffito et al. | |
| 5,494,319 A | 2/1996 | Winfield | |
| 5,503,193 A | 4/1996 | Nygaard | |
| 5,775,379 A | 7/1998 | Manofsky et al. | |
| 5,797,415 A | 8/1998 | Nicholson et al. | |
| 5,871,034 A | 2/1999 | Sumner | |
| 6,092,557 A | 7/2000 | Sumner | |
| 6,155,305 A | 12/2000 | Sumner | |
| 6,182,705 B1 | 2/2001 | Sumner | |
| 6,315,005 B1 | 11/2001 | Sproule | |
| 6,338,366 B1 | 1/2002 | Williams | |
| 6,382,260 B1 | 5/2002 | Sproule | |
| 6,460,576 B2 | 10/2002 | Vitoorapakorn | |
| 6,527,013 B2 | 3/2003 | Somerville et al. | |
| 6,530,603 B1 | 3/2003 | Hartman | |
| 6,688,338 B2 | 2/2004 | Meli et al. | |
| 6,730,407 B2 * | 5/2004 | Mori et al. | 428/425.8 |
| 6,764,730 B2 * | 7/2004 | Sato et al. | 428/35.8 |
| 6,926,040 B1 | 8/2005 | Prescott et al. | |
| 6,978,807 B1 | 12/2005 | Keyes | |
| 7,028,717 B1 | 4/2006 | Keyes | |
| 7,032,621 B2 | 4/2006 | Keyes | |
| 7,037,557 B2 | 5/2006 | Keyes | |
| 7,203,419 B2 | 4/2007 | Malone et al. | |
| 2002/0141712 A1 * | 10/2002 | O'Connor | G02B 6/4435 385/107 |
| 2003/0208976 A1 | 11/2003 | Buchanan | |
| 2004/0079431 A1 * | 4/2004 | Kissell | 138/149 |
| 2004/0126597 A1 * | 7/2004 | Cohen et al. | 428/458 |
| 2006/0054235 A1 * | 3/2006 | Cohen et al. | 138/149 |
| 2007/0119848 A1 | 5/2007 | Ellis et al. | |
| 2008/0066822 A1 | 3/2008 | Varkey et al. | |
| 2008/0201876 A1 | 8/2008 | Hermann | |

FOREIGN PATENT DOCUMENTS

| | | |
|---|---|---|
| DE | 20014466 | 3/2001 |
| EP | 141682 | 8/1989 |
| EP | 145371 | 7/1990 |
| EP | 431649 | 10/1992 |
| EP | 1260356 | 11/2002 |
| EP | 792431 | 3/2003 |
| EP | 1628069 | 2/2006 |
| WO | 1992005381 | 4/1992 |
| WO | 9961833 | 12/1999 |
| WO | 2002012775 | 2/2002 |
| WO | 0281188 | 10/2002 |
| WO | 2009058595 | 5/2009 |

OTHER PUBLICATIONS

Atlas Steels Australia, Stainless Steels—Introduction to the Grades and Families, May 2001, pp. 1-6.*
Woodley, Flexible Membrane Linings for Salt-Gradient Solar Ponds, 1983, American Chemical Society, pp. 1-16.*
Coperion, Calcium Carbonate in Plastics Compounding, retrieved Sep. 16, 2016, p. 1, http://www.ktron.com/industries_served/Plastics/Calcium_Carbonate_in_Plastics_Compounding.cfm.*
International Search Report for PCT/2009/037810 dated Jul. 24, 2009.

* cited by examiner

CORROSION RESISTANT SHEET METAL JACKETING

CROSS-REFERENCE TO RELATED APPLICATION DATA

This application claims the benefit of priority of Provisional U.S. Patent application Ser. No. 61/042,985, filed Apr. 7, 2008, incorporated herein by reference.

BACKGROUND OF THE INVENTION

The present invention is directed to an insulated pipe jacket. More particularly, the present invention pertains to a layered, corrosion resistant sheet metal jacketing system for insulated pipe.

Insulated pipe jacketing generally refers to a sheet of metal surrounding an insulated pipe. Sheet metal jacketing is widely used on piping systems in refineries, power plants, and chemical facilities to protect the insulated pipe from mechanical, chemical, and electrical damage.

Typically, insulated piping and equipment components such as vessels and the like, are jacketed. Aluminum is commonly used, however, in certain situations, stainless steel, and in particular 300 series stainless steel, has been used to protect insulated pipe, vessels and components in, for example, liquid natural gas (LNG) installations and in locations near corrosive environments (salt water environments). However, 300 series stainless steel is expensive, both in initial cost as well as in maintenance and repair. Series 300 is used due to its high resistance to many corrosive materials. Other series of stainless steel are more susceptible to galvanic corrosion and local corrosion and thus are less frequently used. In certain environments, even the most durable stainless steel is susceptible to damage and corrosion, and as such the underlying insulation that the metal jacket protects can become corroded and fail, exposing the underlying pipe.

Accordingly, there is a need for an insulated pipe jacket that is durable and corrosion resistant. Desirably, such a durable metal jacket can be made of a wide variety of different grades or series of stainless steel. More desirably, such a jacket is readily made and usable, and has a high degree of integrity at reduced cost.

BRIEF SUMMARY OF THE INVENTION

A corrosion resistant jacket for insulated pipes and components is formed from an outer polymeric layer film, an inner polymeric layer and a core layer disposed between the outer polymeric layer film and the inner polymeric layer. A contemplated core layer is a lesser stainless steel, such as a Series 200 or 400 stainless steel.

In a present jacket, the outer polymeric film layer is a fluoropolymer, a polyvinylidene fluoride (PVDF), a poly (methyl methacrylate) (PMMA) polymer film, a polyethylene terephthalate (PET), or a polyvinyl chloride (PVC). The film is adhered to the core layer with an adhesive, such as an acrylic adhesive, preferably a pressure sensitive adhesive.

In a present jacket, the outer polymeric layer film is adhered to the core layer and has an initial peel strength of at least 2.3 lbs/in, a peel strength of at least about 4.2 lbs/in following 1000 hrs exposure to QUV-B and a peel strength of at least about 3.6 lbs/in following 2000 hrs exposure to QUV-B. Such a jacket outer polymeric layer film exhibits substantially no chalking following 1000 hrs exposure to QUV-B and little to no chalking following 2000 hrs exposure to QUV-B.

In a present jacket, the outer polymeric layer film has a thickness of about 0.0005 inches to about 0.005 inches, and preferably a thickness of about 0.001 inches. The stainless steel core has a thickness of about 0.010 inches to about 0.024 inches, and preferably a thickness of about 0.016 inches.

In a contemplated jacket, the inner polymeric layer is formed from a material that is pin-hole-free, impermeable to water, chemically resistant and resistant to insulation by-products ions. A present jacket has an inner polymeric layer that is formed, in part, from a polyethylene material, and preferably, a laminate of a polyethylene material and an ethylene acid copolymer resin based sheet material.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
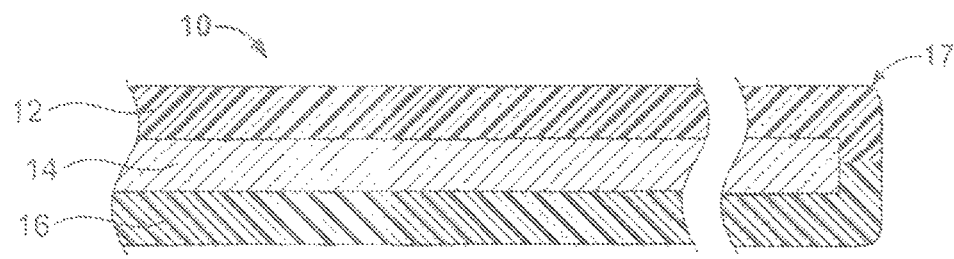
FIG. 1 is a cross-sectional view of a layered sheet metal jacketing system.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring now to the figures and in particular to FIG. 1, there is shown a cross-section of the layered jacket 10 of the present invention. The layered sheet-metal jacket 10 includes generally, an outer, polymeric layer 12, a middle structural layer 14, and an inner polymeric layer 16. The outer layer 12 and the inner layer 16 can be formed from the same material. However, it will be appreciated that the specific materials for the polymer layers 12, 16, should be selected based upon the application, e.g., environment, in which the jacketing 10 is used. For example, it may be that the jacketing is used on piping in a highly acidic environment, in which case the polymeric material (and in particular the outer layer 16 material) must be resistant to corrosion in highly acidic environments. It is also appreciated that minimizing and/or eliminating pin holes, thinned areas and the like is of extreme importance to prevent localized areas in which the underlying structural layer may be susceptible to attack. Likewise, if there any other environmental requirements and/or conditions, the outer layer should be selected based upon those requirements and/or conditions.

In a present jacket 10, a less expensive base material (e.g., 200 or 400 series stainless steel as opposed to a 300 series, such as 304 or 316 stainless steel, plain carbon steel, low alloy carbon steel, or any other material that is more susceptible to corrosion and less costly than 300 series stainless steel) is used in conjunction with the coatings 12, 16, to provide enhanced corrosion resistance. This is referred to as a lesser stainless steel.

A polymeric material such as a fluoropolymer is one suitable material. However, as discussed above, the specific material should be selected based upon various considerations including the chemical environment in which the jacket is used, the environs generally (whether it is used in an enclosed facility or outside and subject to weather conditions), the internal pipe temperature and the desired external jacket temperature.

Preferably, both polymeric materials adhere to the sheet metal 14. In addition, the outer layer 12 preferably is an abrasion resistant polymer, chemically inert to a broad range of chemicals, reduces corrosion between adjacent jackets, prolongs equipment life, and is resistant to fading, staining, chipping or chalking. The inner layer 16 is preferably a durable, non-porous, moisture retardant polymer. The inner layer is preferably of a material that is corrosion resistant and specifically resistant to corrosion from wet insulation, liquid and vapors from leaks in piping systems and components, and exterior (environmental) vapors.

Accordingly, the layers 12, 16 are applied as films, brushed, sprayed, dipped, powder coatings, plasma coating or by other methods that will be recognized by those skilled in the art. It is anticipated that structure of inner layer 12/structural layer 14/outer layer 16 will be laminate in that the layers will all be adhered to one another. In any event, a complete covering or coating of the structural layer 14 should be provided to assure that the integrity of that layer 14 is maintained and is not compromised. The layers 12, 16 and in particular, the inner layer 16 can also be applied as a paint or like coating.

It will be appreciated that the present jacket 10 allows the use of a lower cost structural (metal) layer 14 while maintaining the corrosion resistance of more expensive, chemically and environmentally corrosion-resistant materials. Accordingly, it will be understood that a wide variety of structural layer 14 materials can be used, although it is anticipated that a structural metal layer is used. Other suitable materials will be understood by those skilled in the art, and all such other materials are within the scope and spirit of the present invention.

Figure 2:
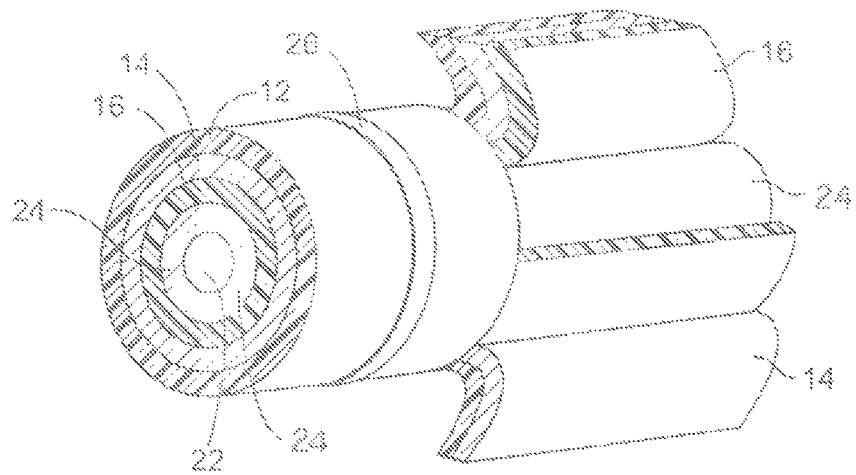
FIG. 2 is a perspective view of a layered sheet metal jacketing system as applied to a section of piping.
Figure 3:
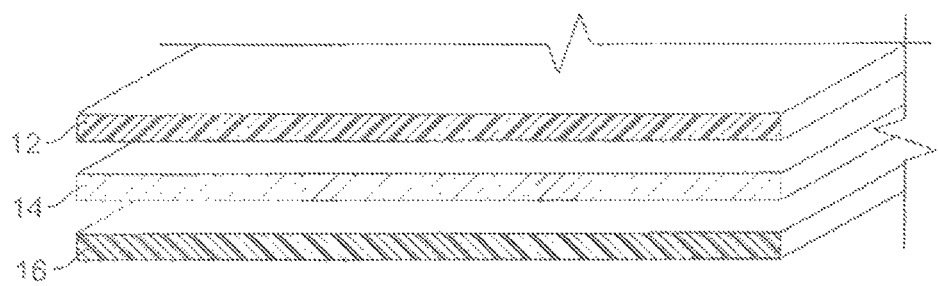
FIG. 3 is an exploded illustration of a laminated structure of the present jacket.

In use, as seen in FIG. 2, sheet-metal jacket 10 encircles a pipe 22 having a layer of insulation 24, wrapped around a pipe 22. The insulation 24 fully surrounds the pipe 22, and the jacket 10 fully surrounds the insulation 24. The jacket 10 can be wrapped around the insulation 24 (generally with a light overlap) and a strap 26 can be wrapped around the jacket 10 to secure the jacket 10 to the pipe 22 and insulation 24. Other methods of fastening the jacket 10 to the insulation 24 and/or to itself (such as screws, rivets or other fasteners) can also be used.

The banding 26 can also be fabricated using a less expensive (200 or 400 series) material that is coated for corrosion resistance. Using a similar metal banding is encouraged to prevent any corrosion due to contact between dissimilar metals. The banding 26 can coated, painted, or treated as by any of the protective measured described herein.

It will be appreciated that the jacket 10 can be fabricated at a fabrication facility and field installed. The jacket 10 may be fabricated and rolled or cut to size in the field as required. In order to protect uncoated edges and the like, it is anticipated that a field applied inner and/or outer coating (12 and/or 16) may be used to provide protection for the jacket edges as well as the jacket surfaces. The field applied coating can be a spray coating, powder coating (with portable heating if necessary), foam coatings, tapes and the like.

Figure 4:
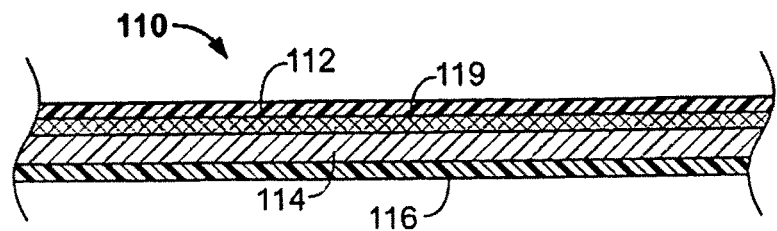
FIG. 4 is a cross-sectional view of the jacket showing an outer higher grade stainless steel material affixed to an inner lower grade stainless steel material.
Figure 5:
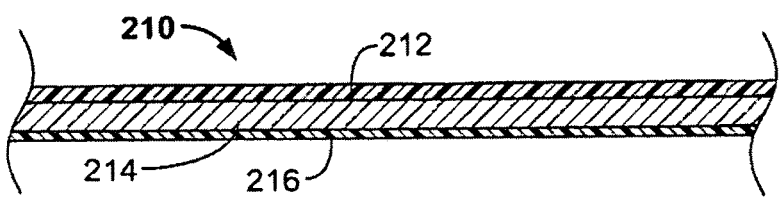
FIG. 5 is a cross-sectional view of an outer spiral wound layer of a higher grade stainless steel material on an inner lower grade stainless steel material.

Referring to FIG. 4, other contemplated configurations for the jacket 110 include an outer layer 112 of thin (0.5 to 5.0 mil) higher grade (e.g., 304 or 316) stainless steel over a base 114 of lower grade stainless steel (200 or 400 series) with a polymeric coating 116 on the inside surface of the base material 114. The outer layer 112 can be applied over the base material layer 114 or, as see in FIG. 5, the outer layer 212 can be spiral wrapped over the inner layer 214. The inner layer 214 can include a polymer coating 216 for corrosion resistance.

Referring again to FIG. 4, the outer layer 112 can be affixed to the base material layer 114 by welding, adhesive or laminate/composite formation with, for example, a bonding polymer, as indicated generally at 119. It is also contemplated that the jacket 10 can be fabricated from passivated stainless steel.

Figure 6:
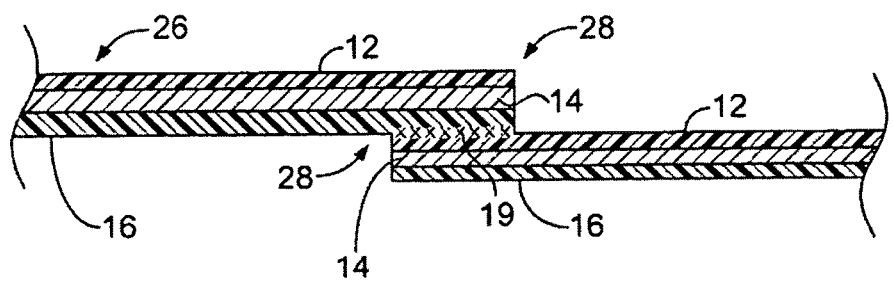
FIG. 6 is a cross-sectional view of a strap joint for the jacket.

As set forth above, the straps 26 can be formed in a manner similar to that of the jacket, by coating, lamination, electro-plating or the like. In one form, as seen in FIG. 6, the ends 28 of the straps 26 can be joined to one another by fusing (indicated generally at 19) the polymer coating (12 and 16) on the strap ends 28, as by welding (the polymer) using a method similar to that used to weld or join plastic strapping material.

It is also envisioned that the edges E of the base or structural layer 14, 114, 214 can be coated (as at 17 in FIG. 1) to prevent the corrosion of the base material 14, 114, 214 from within (that is, from between the inner and outer layers). It will also be appreciated that the edge coating 17 can be pre-applied (e.g., as supplied) or can be field applied to accommodate installation needs as they arise, to provide additional protection to the underlying substrate 14, 114, 214.

Other interior and exterior layers, core materials (metals), processes for application, adhesive, and forms (e.g., shapes) and their respective characteristics are contemplated. For example, core layers can include steel, aluminum and other metals as suitable. Non-metals (as suitable) may also be used. A preferred core metal is, as discussed above, a 200 or 400 series stainless steel.

Interior layer can be a coating, polymeric application, paint, foil and/or composite structure. The interior layers are preferably pin-hole free, impermeable to water, chemically resistant, resistant to degradation due to insulation by-products (e.g., dissolved ions), and tough/abrasion resistant. In addition, the interior layer preferably has good adhesion to the core material, exhibits temperature stability (between at least −60° F. and +160° F.). A present interior layer is formed from a laminate formed from polyethylene sheet and SURLYN® (ethylene acid copolymer resin) commercially available from DuPont Company of Wilmington, Del.

The interior coating can include corrosion inhibitors, can be formed with materials to effect high electric resistance, and/or with a sacrificial layer. A contemplated thickness range is 0.5 to 5.0 mils (thousandths of an inch). The interior layer can also include acoustic and/or vibration attenuating characteristics.

The exterior layer coating, polymeric application or the like. It can be the same as (if suitable) or different from the interior layer. The exterior layer should control emissivity through color, gloss or texture. It can provide additional thermal insulation (in addition to any insulation inboard of the jacket) and can provide acoustic and/or vibration attenuating characteristics. The exterior layer can be a low a surface energy coating and can be a self-cleaning layer/coating/laminate. The exterior layer can be formed having a thickness about the same as that of the interior layer.

The layer(s) can be provided through various processes. For example, the layers can be applied by coil coating and subsequent laminating, they can be provided in a one-step or multi-step application, the base or core can be chemically or mechanically pretreated. The layers can be cured at differing temperatures and for differing periods of time. Shrink wrapping can be applied around the core. The layers can be laminated and/or pressure applied.

When, for example, a film is applied, an adhesive is used to apply that film. The adhesive can be heat activated or pressure activated (pressure sensitive). The adhesive can be a reactive adhesive (e.g., epoxy), it can be a one-part or a two-part epoxy. The adhesive can be formulated with corrosion inhibitors. Or, a mechanical bond can be used.

Although such jackets are often thought of as used in piping systems, it will be appreciated that the jacket can take many forms and be used in many applications. The jacket can be formed as a profiled sheet (for example, for tanks and vessels), it can be in a flat sheet, embossed sheets and jackets. It can be provided as a fitting cover, for elbows, tees and reducers. It can take the form, of valve covers, flange covers, strapping (to secure other jacket) as well as closures/fasteners, panels and enclosures.

Certain laminated products were evaluated for peel strength, the results of which are presented in TABLE 1. The peel strength of various protective films that were adhered using various adhesives under simulated environmental conditions (ultraviolet light exposure). For purposes of presentation, TABLE 1 is broken down into two tables, however, the columns of the second table are a continuation of those in the first table.

TABLE 1

PEEL STRENGTH AND VISUAL EXAMINATION RESULTS PRE AND POST QUV-B EXPOSURE

| Protective Film | Adhesive | Metal | Average Initial peel (lbs/in) | After 1000 hr QUV-B | After 2000 hr QUV-B | Hoop Stress Test (Visual) After 1000 hr QUV-B | After 2000 hr QUV-B |
|---|---|---|---|---|---|---|---|
| Polyester PM200 (Flexcon) | Acrylic PSA (WV95) | 430 SS matte | 3.3 | 4.4* (chalking) | 3.6* (chalking) | Appears ok | Slight chalking |
| Fluoropolymer EXKY 120 (Flexcon) | Acrylic PSA (WV95) | 430 SS matte | 3.2 | 4.2* (appears ok) | 3.6* (appears ok) | Appears ok | Appears ok |
| PVDF 200 (Flexcon) | Acrylic PSA (WV95) | 430 SS matte | 4 | No peel (slight yellow) | No peel (slight yellow) | Appears ok | Appears ok |
| PMMA A200 (Flexcon) | Acrylic PSA (WV95) | 430 SS matte | 2.3 | No peel (appears ok) | No peel (appears ok) | Appears ok | Appears ok |
| PMMA A200 (Flexcon) | Acrylic PSA (WV23) | 430 SS matte | 4.5* | ~5.0* (appears ok) | No peel (appears ok) | Na | na |
| Stick II UV grade polyester | Grey Acrylic PSA | 430 SS matte | 5.8* | ~5.0* (appears ok) | No peel (yellowed) | Na | na |
| PMMA WF001 (Evonik) | Acrylic PSA | 430 SS matte | 4.9 | ~8.5* (slight gloss loss) | No peel (gloss lost) | Appears ok | Appears ok |
| Flexjet vinyl | Acrylic PSA | 430 SS matte | 1.8 | 1.7 | 2.9 | | |
| Stick II White 1 mil polyester DEV-701HT-1.5-92W | Acrylic PSA | 430 SS matte | 3.6* | | | | |
| Grey Polyester (Flexcon) PM 200 Grey V-23 | Acrylic PSA | 430 SS matte | 4* | | | | |
| Scapa Clear PET 627 with White PSA | Acrylic PSA | 430 SS matte | 6* | | | | |
| Scapa Clear UV-PP with White PSA | Acrylic PSA | 430 SS matte | 7.1* | | | | |

In TABLE 1 above, various protective films were paired with adhesives and applied to a substrate or core of Series 430 stainless steel. The peel strength was measured for the material prior to subjecting the material to simulated environmental conditions. The peel strength was measured by pulling the film, 180 degrees from the surface of a flat specimen. The peel strength was measure in pounds per inch (lbs./in). These values are shown in the column entitled Average Initial Peel (lbs/in).

The specimens were then subjected to simulated conditions in an accelerated (mid)ultraviolet testing regimen for periods of 1000 hours and 2000 hours (1000 hr QUV-B and 2000 hr QUV-B) according to ASTM G154. Following the QUV-B testing, peel strength was again measured by pulling the film 180 degrees from the surface of a flat specimen. The peel strength in shown in the columns "After 1000 hr QUV-B" and "After 2000 hr QUV-B", respectively.

In each of the cases, a visual examination of the specimens was conducted to determine the integrity of the sample following simulated environmental conditions. The visual examination noted the appearance and existence of chalking which is the condition in which the film begins to degrade and a chalky film (chalky to the touch) appears on the surface. The appearance or non-appearance of chalking is indicated in the "After 1000 hr QUV-B" and "After 2000 hr QUV-B" columns along with the peel test results.

Samples were also subjected to additional simulated field application conditions in addition to the 1000 hr and 2000 hr QUV-B exposure. In this simulated application, the specimens were bent or rolled to simulate the jacket applied to a pipe or other rounded surface component (vessels, tanks and the like). In that peel tests are conducted on flat specimens, peel test results were not available (due to the now curved shape of the jacket). Nevertheless, a visual examination of the specimens was conducted, the results of which are shown in the TABLES.

In the tested specimens, the protective films that were used were: polyester film, PM200, commercially available from FLEXcon of Spencer, Mass. adhered to a Series 430 stainless steel core or substrate using an acrylic pressure sensitive adhesive (WV 95); fluoropolymer EXKY 120, commercially available from FLEXcon adhered to a Series 430 stainless steel core using an acrylic pressure sensitive adhesive (WV 95); polyvinylidene fluoride, PVDF 200 film, commercially available from FLEXcon, adhered to a Series 430 stainless steel core using an acrylic pressure sensitive adhesive (WV 95); poly(methyl methacrylate), PMMA A200 film, commercially available from FLEXcon, adhered to a Series 430 stainless steel core using an acrylic pressure sensitive adhesive; poly(methyl methacrylate), PMMA A200 film, commercially available from FLEXcon, adhered to a Series 430 stainless steel core using an acrylic pressure sensitive adhesive (WV 23); Stick II UV grade polyester, commercially available from Stick II Products, under the tradename NT-UVPW-ITW, adhered to a Series 430 stainless steel core using a grey acrylic pressure sensitive adhesive commercially available from Dielectric Polymers under the tradename NT-701HT; poly(methyl methacrylate), PMMA film, commercially available from Evonik DeGussa GmbH of Essen, Germany, under the tradename WF001, adhered to a Series 430 stainless steel core using an acrylic pressure sensitive adhesive commercially available from Air Products, under the tradename Flexbond 153; Flexjet vinyl adhered to Series 430 stainless steel core using an acrylic pressure sensitive adhesive; Stick II white 1 mil polyester, commercially available from Stick II Products under the tradename DEV-701HT-1.5-92W, adhered to a Series 430 stainless steel core using an acrylic pressure sensitive adhesive commercially available from Dielectric Polymers under the tradename NT-701HT; Grey polyester film, PM200 Grey, commercially available from FLEXcon, adhered to a Series 430 stainless steel core using an acrylic pressure sensitive adhesive WV-23; polyethylene terephthalate (PET) film, commercially available from Scapa North America of Windsor Conn., under product number 627, adhered to a Series 430 stainless steel core using an acrylic pressure sensitive adhesive; and polypropylene (PP) film, commercially available from Scapa North America of Windsor Conn., under tradename Clear UV-PP, adhered to a Series 430 stainless steel core using an acrylic pressure sensitive adhesive.

As is seen from the results, a preferred embodiment of the corrosion resistant jacket is formed from a core of a Series 400 stainless steel with an inner protective layer, preferably a polymeric layer. Series 200 is also contemplated. The outer protective layer is preferably a film, more preferably a fluoropolymer, a PVDF or PMMA polymer film adhered to the core using an acrylic pressure sensitive adhesive. A preferred interior layer is formed from a laminate formed from polyethylene sheet and SURLYN® (ethylene acid copolymer resin) commercially available from DuPont Company of Wilmington, Del.

Advantageously, the present insulated pipe jacket that is durable and corrosion resistant. It can be made from of a wide variety of different grades or series of stainless steel, such as Series 200 and Series 400 stainless steels to reduce cost, without sacrificing integrity and the ability to withstand severe environmental conditions. A present jacket is readily made in a prefabricated manner or in the field and has a high degree of integrity and functionality.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A pipe and component insulation corrosion resistant jacket comprising:
   a pipe;
   a corrosion resistant jacket wrapped around the pipe with an overlap, the corrosion resistant jacket comprising:
      an outer polymeric layer film; wherein the outer polymeric film layer is one of a fluoropolymer, a polyvinylidene fluoride, a poly(methyl methacrylate) polymer, and polyvinyl chloride film;
      an inner polymeric layer, the inner polymeric layer being formed from a non-porous material that is pin-hole free, impermeable to water; chemically resistant and resistant to insulation by-product ions, wherein the non-porous material is a laminate comprising a polyethylene sheet of material and an ethylene acid copolymer resin; and
      a stainless steel core layer disposed between the outer polymeric layer film and the inner polymeric layer, the stainless steel core layer is formed from a Series 200 or Series 400 stainless steel,
wherein the outer polymeric film and the inner polymeric layer each extend over a respective face of the stainless steel core layer and an edge of the stainless steel core layer between the faces;
a strap wrapped around the jacket to secure the jacket to the pipe, the strap having a structural layer and inner and outer coating layers disposed on opposite sides of the structural layer,
wherein the outer polymeric layer film includes an inner surface that is adhered to the stainless steel core layer by an adhesive, and an exposed outer surface at an opposite side of the polymeric layer film from the inner surface that is open to surrounding environs; and
wherein the inner polymeric layer includes an outer surface that is adhered directly to the stainless steel core layer and an inner surface facing the pipe or component.

2. The corrosion resistant jacket in accordance with claim 1 wherein the stainless steel core layer is a Series 200 stainless steel.

3. The corrosion resistant jacket in accordance with claim 1 wherein the stainless steel core layer is a Series 400 stainless steel.

4. The corrosion resistant jacket in accordance with claim 1 wherein the adhesive is an acrylic adhesive.

5. The corrosion resistant jacket in accordance with claim 4 wherein the acrylic adhesive is a pressure sensitive adhesive.

6. The corrosion resistant jacket in accordance with claim 1 wherein the adhesive is a silicone adhesive.

7. The corrosion resistant jacket in accordance with claim 6 wherein the silicone adhesive is a pressure sensitive adhesive.

8. The corrosion resistant jacket in accordance with claim 1 wherein the outer polymeric layer film is adhered to the stainless steel core layer and has an initial peel strength of at least 1.8 lbs/in.

9. The corrosion resistant jacket in accordance with claim 8 wherein the outer polymeric layer film is adhered to the stainless steel core layer and has an initial peel strength of at least 1.8 lbs/in, and has a peel strength of at least about 1.7 lbs/in following 1000 hrs exposure to QUV-B.

10. The corrosion resistant jacket in accordance with claim 9 wherein the outer polymeric layer film is adhered to the stainless steel core layer and has a peel strength of at least about 2.9 lbs/in following 2000 hrs exposure to QUV-B.

11. The corrosion resistant jacket in accordance with claim 8 wherein the outer polymeric layer film exhibits substantially no chalking following 1000 hrs exposure to QUV-B.

12. The corrosion resistant jacket in accordance with claim 11 wherein the outer polymeric layer film exhibits substantially no chalking following 2000 hrs exposure to QUV-B.

13. The corrosion resistant jacket in accordance with claim 1 wherein the outer polymeric layer film has a thickness of about 0.0005 inches to about 0.005 inches.

14. The corrosion resistant jacket in accordance with claim 13 wherein the outer polymeric layer film has a thickness of about 0.001 inches.

15. The corrosion resistant jacket in accordance with claim 1 wherein the stainless steel core layer has a thickness of about 0.010 inches to about 0.024 inches.

16. The corrosion resistant jacket in accordance with claim 15 wherein the stainless steel core layer has a thickness of about 0.016 inches to about 0.020 inches.

* * * * *